(12) United States Patent
Hauth

(10) Patent No.: US 10,060,108 B2
(45) Date of Patent: Aug. 28, 2018

(54) INSERT PART HAVING A WATER-CHANNELING CARTRIDGE HOUSING

(71) Applicant: Neoperl GmbH, Mullheim (DE)

(72) Inventor: Matthias Hauth, Todtnau/Muggenbrunn (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 15/714,283

(22) Filed: Sep. 25, 2017

(65) Prior Publication Data
US 2018/0112380 A1    Apr. 26, 2018

(30) Foreign Application Priority Data

Oct. 24, 2016  (DE) .................... 20 2016 006 536 U

(51) Int. Cl.
| F16K 15/00 | (2006.01) |
| E03C 1/10 | (2006.01) |
| F16K 27/02 | (2006.01) |
| F16K 15/06 | (2006.01) |
| E03C 1/02 | (2006.01) |

(52) U.S. Cl.
CPC .......... *E03C 1/104* (2013.01); *F16K 27/0209* (2013.01); *E03C 1/025* (2013.01); *E03C 2201/40* (2013.01); *F16K 15/063* (2013.01)

(58) Field of Classification Search
CPC .... F16K 15/063; F16K 27/0209; E03C 1/104; Y10T 137/6011
USPC .......... 137/315.11, 511, 528, 535, 540, 542, 137/543, 543.13, 543.19
See application file for complete search history.

(56) References Cited

U.S. PATENT DOCUMENTS

| 5,370,150 A | * | 12/1994 | Nehm | ............... B29C 45/14344 |
| | | | | 137/454.2 |
| 5,482,080 A | | 1/1996 | Bergmann | |
| 6,234,194 B1 | * | 5/2001 | Jainek | ................... F16K 15/026 |
| | | | | 137/375 |
| 6,484,950 B2 | * | 11/2002 | Hirota | ................... F25B 41/062 |
| | | | | 137/315.11 |
| 6,902,123 B2 | * | 6/2005 | Grether | ................... E03C 1/084 |
| | | | | 239/428.5 |

(Continued)

FOREIGN PATENT DOCUMENTS

| DE | 29703335 | 4/1997 |
| WO | 9301434 | 1/1993 |

*Primary Examiner* — Reinaldo Sanchez-Medina
(74) *Attorney, Agent, or Firm* — Volpe and Koenig, P.C.

(57) ABSTRACT

An insert part is provided having a water-channeling cartridge housing which is insertable into a housing holder in a water line. The water-channeling cartridge housing includes at least one encircling annular groove on an outer circumference thereof, and a sealing ring is arranged in this groove. The sealing ring has a ring cross section with a sub-region that projects radially outward beyond the annular groove. At least one component is assigned to the insert part and has an end side that is directed toward the insert part. The end side includes at least one retaining protrusion by which the component, in a latched position on the outer circumference of the cartridge housing, is latched to the cartridge housing to form a unit. Here, the at least one retaining protrusion is latched in the at least one annular groove that receives the sealing ring.

10 Claims, 1 Drawing Sheet

(56) References Cited

U.S. PATENT DOCUMENTS

| | | | |
|---|---|---|---|
| 8,408,244 B2* | 4/2013 | Gilcher | E03C 1/104 |
| | | | 137/454.2 |
| 9,869,402 B2* | 1/2018 | Ho | F16K 15/063 |
| 2004/0074539 A1* | 4/2004 | Weis | E03C 1/104 |
| | | | 137/543 |
| 2006/0060248 A1* | 3/2006 | Fangmeier | E03C 1/104 |
| | | | 137/542 |
| 2008/0210310 A1* | 9/2008 | Gilcher | E03C 1/104 |
| | | | 137/215 |
| 2011/0005618 A1* | 1/2011 | Lin | B05B 1/3006 |
| | | | 137/516.25 |
| 2016/0076189 A1* | 3/2016 | Lee | D06F 39/10 |
| | | | 137/511 |

* cited by examiner

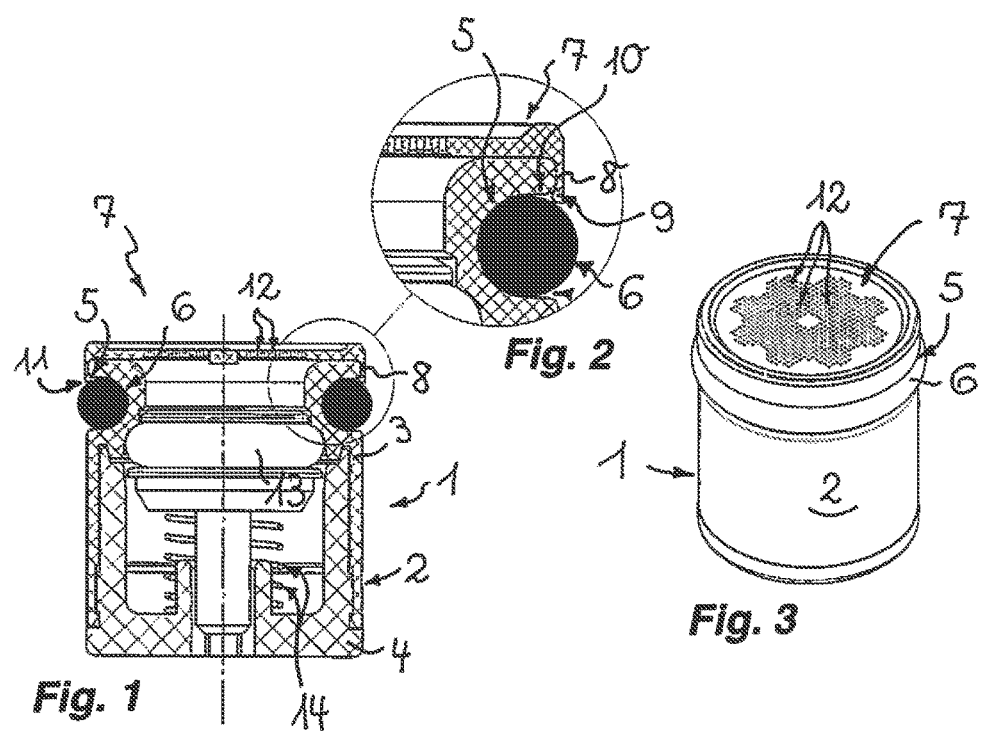

INSERT PART HAVING A WATER-CHANNELING CARTRIDGE HOUSING

INCORPORATION BY REFERENCE

The following documents are incorporated herein by reference as if fully set forth: German Patent Application No. 20 2016 006 536.0, filed Oct. 24, 2016.

BACKGROUND

The invention relates to an insert part having a water-channeling cartridge housing, which can be inserted into a housing holder in a water line and which, on the outer circumference of the cartridge housing, has at least one encircling annular groove, in which annular groove is arranged a sealing ring, which has a sub-region of its ring cross section projecting radially outward beyond the annular groove, and having at least one component, which is assigned to the insert part and, on its end side which is directed toward the insert part, has at least one retaining protrusion, by which retaining protrusion the component, in a latched position on the outer circumference of the cartridge housing, is latched to the insert part to form a unit.

DE 297 03 335 U1 has already disclosed a sanitary insert part which is of the type mentioned in the introduction and is designed in the form of a backflow preventer. The previously known insert part has a cartridge housing, which can be inserted into a housing holder in a sanitary water line. The outer circumference of the cartridge housing has provided on it at least one encircling annular groove, in which annular groove is arranged a sealing ring, which has a sub-region of its ring cross section projecting radially outward to a small extent beyond the annular groove, and therefore the sealing ring can seal the annular gap between the outer circumference of the cartridge housing and the inner circumference of that line portion which forms the housing holder. The previously known insert part, on its inflow end side, bears a hat-shaped filter screen which, on its end periphery which is directed toward the insert part, has at least one retaining protrusion, which is designed in the form of an annular wall and by which the filter screen can be latched on a reduced-external-diameter housing protrusion, which projects from the end side of the insert part, to form a unit comprising the insert part and the filter screen. Since the latching element on the insert parts, on the one hand, and on the filter screen, on the other hand, are adapted to one another, the sanitary insert part is intended solely for use in conjunction with the filter screen and at least the filter screen cannot also be used with such insert parts as were originally intended for use without an inflow-side filter screen and which therefore do not have the necessary end-side mating protrusion.

EP 0 593 490 B1 already discloses a sanitary insert part which is likewise designed in the form of a backflow preventer and in the case of which the cartridge housing of the insert part is connected in one piece, on its inflow side, to a hat-shaped filter screen. It is therefore the case that it is not possible for the insert part to also be used without a filter screen.

The previously known insert parts described above can be inserted, by way of their cartridge housing, into the housing holder provided in a sanitary water line. It is additionally also the case, however, that insert parts designed, in particular, in the form of backflow preventers are required for other application areas, for example in the water line of a water-consuming appliance.

In order to render such insert parts as versatile as possible, it may therefore be advantageous if the insert part can be used optionally with and without the component designed, for example, in the form of a filter screen and if the insert part, if required, can also be connected subsequently to such a component.

SUMMARY

The object is therefore to create an insert part which is of the type mentioned in the introduction and can be used optionally with and without the component which performs a further function, wherein the insert part, if required, should also still be capable of being connected subsequently to such a component.

This object is achieved according to the invention, in the case of the insert part of the type mentioned in the introduction, in particular in that the at least one retaining protrusion, in the latched position, is latched in the at least one annular groove intended for the sealing ring.

The insert part according to the invention has a water-channeling cartridge housing, which can be inserted into a housing holder which is incorporated in a water line preferably between two line portions which can be connected to one another in a releasable manner. It is possible here for the insert part according to the invention to be inserted, for example, into the housing holder provided in a sanitary water line or into the housing holder of the water line located in a water-consuming appliance and in particular in a coffee machine. The outer circumference of the cartridge housing has provided on it at least one encircling annular groove, in which is arranged a sealing ring, which has a sub-region of its ring cross section projecting radially outward beyond the annular groove such that said sealing ring can seal the annular gap which remains between the outer circumference of the cartridge housing and the inner line circumference in the region of the housing holder. The insert part is assigned a component which, on its end side which is directed toward the insert part, has at least one retaining protrusion, by which the component, in a latched position on the outer circumference of the cartridge housing, can be latched to the insert part to form a unit. According to the invention, provision is made here for the at least one retaining protrusion, in the latched position, to be latched in the at least one annular groove intended for the sealing ring. This makes it optionally possible to use either the unit comprising the insert part and the component latched thereto or just the insert part without this component, and also subsequent latching of the component on such an insert part is further possible if required.

A particularly straightforward and advantageous embodiment according to the invention makes provision here for the at least one retaining protrusion, on its free peripheral region, to bear at least one latching protrusion, which, in the latched position, engages with latching action in the annular groove in the region between the sealing ring and an adjacent flank of the annular groove. In the case of this particularly compact and space-saving embodiment, the retaining protrusion, on its free peripheral region, bears at least one latching protrusion by which the retaining protrusion can act in a latching manner on that flank of the annular groove which is adjacent to the sealing ring.

A particularly straightforward and nevertheless particularly stable embodiment according to the invention makes provision for the retaining protrusion to be designed in the form of an encircling annular wall which, in the latched position, encloses that portion of the cartridge housing which is provided between the annular groove and that end surface of the cartridge housing which is directed toward the component. This embodiment according to the invention, at the same time, makes provision for the annular groove provided on the outer circumference of the cartridge housing to be arranged in that sub-region of the cartridge housing which is directed toward one of the end surfaces of the cartridge housing, and preferably in that sub-region of the outer housing circumference which is adjacent to the inflow end surface of the cartridge housing.

A fixed latching connection between the insert part according to the invention, on the one hand, and the component assigned to it, on the other hand, is facilitated if the annular wall serving as the retaining protrusion bears at least one, preferably encircling, latching protrusion on its inner circumference.

A compact construction of the unit comprising the insert part and the associated component is facilitated if the at least one latching protrusion engages with latching action in the encircling free space or annular space which remains between the cross-sectionally round sealing ring and the adjacent flank of the latching groove.

In order also to make it easier for the component which performs a further function to be fitted subsequently on the insert part according to the invention, it is advantageous if the at least one retaining protrusion has a thickness which is dimensioned such that the outer side of the at least one retaining protrusion remains behind the maximum outer circumference of the sealing ring, as seen in the radial direction.

A functionally reliable and low-maintenance embodiment of the insert part according to the invention makes provision for the component assigned to it to be designed in the form of a filter screen. A filter screen arranged on the inflow side of the insert part is able to filter out those lime residues and particles of dirt which are entrained in the inflowing water and could otherwise prevent the insert part from functioning as it should.

It is also still possible for the insert part according to the invention to be subsequently retrofitted, if required, with the component which performs an additional function, without a housing holder of greater longitudinal extent having to be sought and used for this purpose, if the component designed in the form of a filter screen has a preferably plate-like screen surface which is oriented transversely to the through-flow direction.

A particularly advantageous use of the insert part according to the invention makes provision for said insert part to be configured in the form of a backflow preventer.

Preferred use examples of the insert part according to the invention make provision, for example, for the insert part to be capable of insertion, by way of its cartridge housing, into the housing holder provided in a sanitary water line or into the housing holder of the water line of a water-consuming appliance and in particular of a coffee machine.

BRIEF DESCRIPTION OF THE DRAWINGS

Developments according to the invention can be gathered from the claims in conjunction with the drawing and the description. The invention will be described in yet more detail herein below with reference to a preferred exemplary embodiment.

In the drawings:

FIG. 1 shows an insert part which is illustrated in a longitudinal section and, in the latched position shown here, is latched to an inflow-side component, in this case designed in the form of a filter screen, to form a unit, FIG. 2 shows a detail-view longitudinal section through the unit comprising the insert part and the inflow-side component, the longitudinal section running through the region of the latching connection between said associated constituent parts of the unit comprising the insert part and filter screen, and FIG. 3 shows a perspective plan view of the inflow side of the unit shown in FIGS. 1 and 2 and made up of the insert part and the component.

DETAILED DESCRIPTION OF THE PREFERRED EMBODIMENTS

FIGS. 1 to 3 illustrate an insert part 1, which in this case is designed in the form of a backflow preventer. The insert part 1 has a cartridge housing 2, which in this case comprises an inflow-side housing part 3 and an outflow-side housing part 4, the two housing parts being pushed one inside the other. The cartridge housing 2, which in this case is of two-part design, can be inserted into a housing holder, which is incorporated between two portions of a water line (not illustrated specifically here). Preferred use examples here make provision for the insert part 1 to be capable of being inserted into the housing holder located in a sanitary water line or into the housing holder of the water line of a water-consuming appliance, for example of a coffee machine. The outer circumference of the cartridge housing 2 has provided on it an encircling annular groove 5, in which annular groove 5 is arranged a sealing ring 6, which has a sub-region of its, in this case round, ring cross section projecting radially outward beyond the annular groove 5.

The insert part 1 is assigned a component 7 which performs a further function. The component 7 in this case is designed in the form of a filter screen, by which the lime deposits or particles of dirt entrained in the inflowing water stream are filtered out before they can impair the function of the insert part 1. It is clear from the detail-view longitudinal section in FIG. 2 that the retaining protrusion 5, in the latched position shown here, is latched in the annular groove 5 intended for the sealing ring 6. This makes it optionally possible to use either the unit comprising the insert part 1 and the component 7 latched thereto or just the insert part 1 without the component 7, and also subsequent latching of the component 7 on such an insert part 1 is further possible if required.

It can be seen in the longitudinal sections according to FIGS. 1 and 2 that the retaining protrusion 8 is designed in the form of an encircling annular wall which, in the latched position, encloses that portion of the cartridge housing 2 which is provided between the annular groove 5 and that end surface of the cartridge housing 2 which is directed toward the component 7.

The encircling retaining protrusion 8, on its free peripheral region, in this case bears at least one latching protrusion 9, which, in the latched position, engages with latching action in the annular groove 5 in the region between the sealing ring 6 and an adjacent flank 10 of the annular groove 5. The latching protrusion 9 here acts in a latching manner on the outer-circumference periphery of the flank 10 of the annular groove 5.

The encircling latching protrusion 9, which is formed on the inner circumference of the retaining protrusion 8, engages with latching action in the encircling free space or annular space 11 which remains between the cross-sectionally round sealing ring 6 and the adjacent flank 10 of the annular groove 5.

It is clear from the comparison of FIGS. 1 and 2 that the retaining protrusion 8 has a thickness which is dimensioned such that the outer side of the at least one retaining protrusion 8 remains behind the maximum outer circumference of the sealing ring 6, as seen in the radial direction. This means that the insert part 1 illustrated here can be inserted in the same housing holder of the water line irrespective of whether the insert part 1 is latched to the component 7 or not.

The component 7 here is designed in the form of a filter screen. The small filter openings 12 in the filter screen can be seen in FIG. 3. The component 7 designed in the form of a filter screen here has an in this case plate-like screen surface which is oriented transversely to the throughflow direction.

A valve body 13 is guided in a displaceable manner in the housing interior of the insert part 1 configured in the form of a backflow preventer, and said valve body can be displaced from the closed position, which is shown in FIG. 1, into an open position under the pressure of the oncoming water, counter to the restoring force of a restoring spring 14.

LIST OF REFERENCE SIGNS

1 Insert part
2 Cartridge housing
3 Inflow-side housing part
4 Outflow-side housing part
5 Annular groove
6 Sealing ring
7 Component
8 Retaining protrusion
9 Latching protrusion
10 Groove flank
11 Annular space
12 Filter openings or screen openings
13 Valve body
14 Restoring spring

The invention claimed is:

1. An insert part (1) comprising a water-channeling cartridge housing (2) which is insertable into a housing holder in a water line, the water-channeling cartridge housing (2) including at least one encircling annular groove (5) on an outer circumference thereof, a sealing ring (6) arranged in said annular groove (5), the sealing ring (6) having a ring cross section with a sub-region that projects radially outward beyond the annular groove (5), at least one component (7) assigned to the insert part (1), the component (7) having an end side that is directed toward the insert part (1), the end side including at least one retaining protrusion (8) by which the component (7), in a latched position on the outer circumference of the cartridge housing (2), is latched to the cartridge housing to form a unit, and the at least one retaining protrusion (8) is latched in the at least one annular groove (5) that receives the sealing ring (6).

2. The insert part as claimed in claim 1, wherein the at least one retaining protrusion (8), on a free peripheral region thereof, bears at least one latching protrusion (9), that in the latched position, engages with a latching action in the annular groove (5) in a region between the sealing ring (6) and an adjacent flank (10) of the annular groove (5).

3. The insert part as claimed in claim 1, wherein the retaining protrusion (8) comprises an encircling annular wall which, in the latched position, encloses that portion of the cartridge housing (2) which is provided between the annular groove (5) and an end surface of the cartridge housing (2) which is directed toward the component (7).

4. The insert part as claimed in claim 3, wherein the annular wall bears at least one latching protrusion (9) on an inner circumference thereof.

5. The insert part as claimed in claim 4, wherein the at least one latching protrusion (9) engages with a latching action in an encircling free space or annular space (11) which remains between the sealing ring (6), which is cross-sectionally round, and an adjacent flank (10) of the annular groove (5).

6. The insert part as claimed in claim 1, wherein the at least one retaining protrusion (8) has a thickness which is dimensioned such that an outer side of the at least one retaining protrusion (8) remains behind a maximum outer circumference of the sealing ring (6), as seen in a radial direction.

7. The insert part as claimed in claim 1, wherein the component (7) is a filter screen.

8. The insert part as claimed in claim 7, wherein the filter screen has a screen surface which is oriented transversely to a throughflow direction.

9. The insert part as claimed in claim 1, wherein the insert part (1) is configured as a backflow preventer.

10. The insert part as claimed in claim 1, wherein the insert part (1) is insertable via the cartridge housing (2), into the housing holder provided in a sanitary water line or into the housing holder arranged in the water line of a water-consuming appliance.

\* \* \* \* \*